United States Patent
Mano et al.

[11] Patent Number: 5,978,807
[45] Date of Patent: Nov. 2, 1999

[54] APPARATUS FOR AND METHOD OF AUTOMATICALLY DOWNLOADING AND STORING INTERNET WEB PAGES

[75] Inventors: Yoshizumi Mano, Cupertino; Chenchu Chilamakuri, Fremont; Hisato Shima, Saratoga, all of Calif.

[73] Assignees: Sony Corporation, Tokyo, Japan; Sony Electronics, Inc., Park Ridge, N.J.

[21] Appl. No.: 08/941,583

[22] Filed: Sep. 30, 1997

[51] Int. Cl.⁶ ..................................... G06F 17/30
[52] U.S. Cl. ............................... 707/10; 707/2; 707/104; 707/500; 707/513
[58] Field of Search ................. 707/2, 10, 104, 707/500, 513

[56] References Cited

U.S. PATENT DOCUMENTS

| | | | |
|---|---|---|---|
| 3,704,363 | 11/1972 | Salmassy et al. | 235/153 |
| 4,644,532 | 2/1987 | George et al. | 370/94 |
| 5,237,507 | 8/1993 | Chasek | 364/464.04 |
| 5,682,330 | 10/1997 | Seaman et al. | 707/104 |
| 5,694,546 | 12/1997 | Reisman | 395/200.9 |
| 5,694,547 | 12/1997 | Subramanian et al. | 395/200.11 |
| 5,737,619 | 4/1998 | Judson | 707/500 |
| 5,764,910 | 6/1998 | Shachar | 395/200.53 |
| 5,768,119 | 6/1998 | Havekost et al. | 364/133 |
| 5,774,667 | 6/1998 | Garvey et al. | 395/200.52 |
| 5,781,909 | 7/1998 | Logan et al. | 707/200 |
| 5,802,511 | 9/1998 | Kouchi et al. | 707/2 |
| 5,842,027 | 11/1998 | Oprescu et al. | 395/750.01 |

FOREIGN PATENT DOCUMENTS

| | | | |
|---|---|---|---|
| 0 280 020 A3 | 8/1988 | European Pat. Off. | G06F 15/74 |
| 0 331 442 A2 | 9/1989 | European Pat. Off. | G06F 15/24 |
| 0 525 947 A1 | 2/1993 | European Pat. Off. | G07G 1/00 |
| 1 503 804 | 3/1978 | United Kingdom | G06F 11/00 |

OTHER PUBLICATIONS

IEEE, "1395–1995 Standard for a High Performance Serial Bus," 1995, USA.

Schilit, Bill N., "TeleWeb: Loosely connected access to the World Wide Web", Computer Networks and Isdn Systems, vol.: 28, Issue: 11, May 1996 pp. 1431–1444.

*Primary Examiner*—Paul R. Lintz
*Assistant Examiner*—Shahid Alam
*Attorney, Agent, or Firm*—Haverstock & Owens LLP

[57] ABSTRACT

A computer system or other internet access device is programmed to automatically access specified web pages periodically and download the information from the web page to the computer system. Through a user interface, a user programs the computer system by entering an internet address of the web page and an access interval. The access interval is the interval at which versions of the web page will be downloaded; e.g. hourly, daily or weekly. On that periodic basis the computer system or other internet access device then automatically accesses the specified web page and downloads the available information. This information is stored within a memory device associated with the computer system. The user can then access the downloaded information and view the web page without connecting to the internet to determine if there is anything of interest to the user on the web page. If there is information of interest and the user would like to obtain additional information, the user can then access the appropriate web page at a convenient time to obtain the additional information.

23 Claims, 3 Drawing Sheets

| FAVORITE ADDRESSES | | | | |
|---|---|---|---|---|
| ADDRESS | NICKNAME | INTERVAL | LAST UPDATED | VIEWED |
| SONY.COM | SONY | DAY | 3-6-97; 12:00 AM | YES |
| STOCKS.COM | QUOTES | HOUR | 3-6-97; 10:00 AM | NO |

APPARATUS FOR AND METHOD OF AUTOMATICALLY DOWNLOADING AND STORING INTERNET WEB PAGES

FIELD OF THE INVENTION

The present invention relates to the field of acquiring information from the internet or world wide web. More particularly, the present invention relates to the field of using a computer system to automatically acquire information from the internet or the world wide web.

BACKGROUND OF THE INVENTION

An abundance of information is now available to users of the internet or world wide web. Sometimes the amount of available information is overwhelming to users. However, even with the wealth of information available, users of the internet often routinely return to their favorite sites and web pages.

Access to the internet and world wide web can be slow and time consuming, especially during the most popular hours of the day. Access can be much faster during the off-peak hours when not as many users are accessing the system. Even during the off-peak hours it can be time consuming to access a web page or internet site to determine if it has been updated or if there is any new information of interest to a user.

When accessing an internet site, a user instructs the computer to dial up the server of the user's internet service provider. The computer or settop box then controls the operation of a modem to establish the connection with the internet service provider. Once a connection has been made between the modem and the internet service provider, the user must then log on to the service, usually by entering a username and a password. When the user is logged on to the service, the user can then access services and information provided by the service provider and also information available through web pages at other addresses on the internet. When accessing information available through the internet, the user connects through their service provider to other servers which are providing information. This information is usually provided at internet sites and web pages. Each internet site and web page has a particular address through which it can be accessed. By entering this address, the user is instructing their internet service provider to connect them to that address.

Each internet site or web page typically has information about a certain subject. For example, an internet site provided by a newspaper will typically have current news, stories and other information provided by the newspaper. Other sites might have news, information and stock quotes about particular companies or types of companies. Still another site might have information related to a particular type of automobile. A user desiring to access such a site in order to discover whether there is any new information available since the last time the user accessed the site or any information of interest to the user, must perform the entire log on process and wait while the site is accessed through the service provider. For a user interested in many different subjects, this can be a very time-consuming process.

There are currently services which will automatically conduct a search and provide a user with information about a particular subject which is available on the internet. Typically, to use such a service, a user will enter the specific subject matter about which they would like to obtain information. This service then automatically searches the internet for the user and obtains information about the specific subject matter. This information will be gathered by the search service from many different sites on the internet. The user is then provided with a report outlining this information and the sites from where it was gathered.

The IEEE 1394 standard, "P1394 Standard For A High Performance Serial Bus," Draft 8.02v2, Jul. 7, 1995, is an international standard for implementing an inexpensive high-speed serial bus architecture which supports both asynchronous and isochronous format data transfers. The IEEE 1394 standard provides a high-speed serial bus for interconnecting digital devices thereby providing a universal I/O connection. The IEEE 1394 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. An 'application' as used herein will refer to either an application or a device driver.

The cable specified by the IEEE 1394 standard is very thin in size compared to many other cables, such as conventional co-axial cables, used to connect such devices. Devices can be added and removed from an IEEE 1394 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

What is needed is a system which automatically obtains information from user specified internet sites. What is further needed is a system which automatically obtains information from specific internet sites during a specified time period, while a user is not using the system.

SUMMARY OF THE INVENTION

A computer system or other internet access device is programmed to automatically access specified web pages periodically and download the information from the web page to the computer system. Through a user interface, a user programs the computer system by entering an internet address of the web page and an access interval. The access interval is the interval at which versions of the web page will be downloaded; e.g. hourly, daily or weekly. On that periodic basis the computer system or other internet access device then automatically accesses the specified web page and downloads the available information. This information is stored within a memory device associated with the computer system. The user can then access the downloaded information and view the web page without connecting to the internet to determine if there is anything of interest to the user on the web page. If there is information of interest and the user would like to obtain additional information, the user can then access the appropriate web page at a convenient time to obtain the additional information.

DETAILED DESCRIPTION OF THE PREFERRED EMBODIMENT

An apparatus for and method of automatically downloading and storing web pages allows a user to program a computer system or other internet access device to automatically access specified web pages periodically and download the information from the web page to the computer system. The user can then later look at the downloaded information to determine if there is anything of interest to the user on the specified web pages thus saving the user the time required to actually gain access to the web page on the internet. If there is information of interest and the user would like to obtain additional information, the user can then access the appropriate web page at a convenient time to obtain the additional information. This allows the user to review the downloaded information at their computer or other internet access device and make a decision on whether or not the new information on that web page is of interest to them without waiting through the delays associated with actually accessing the web page on the internet.

Figure 1:
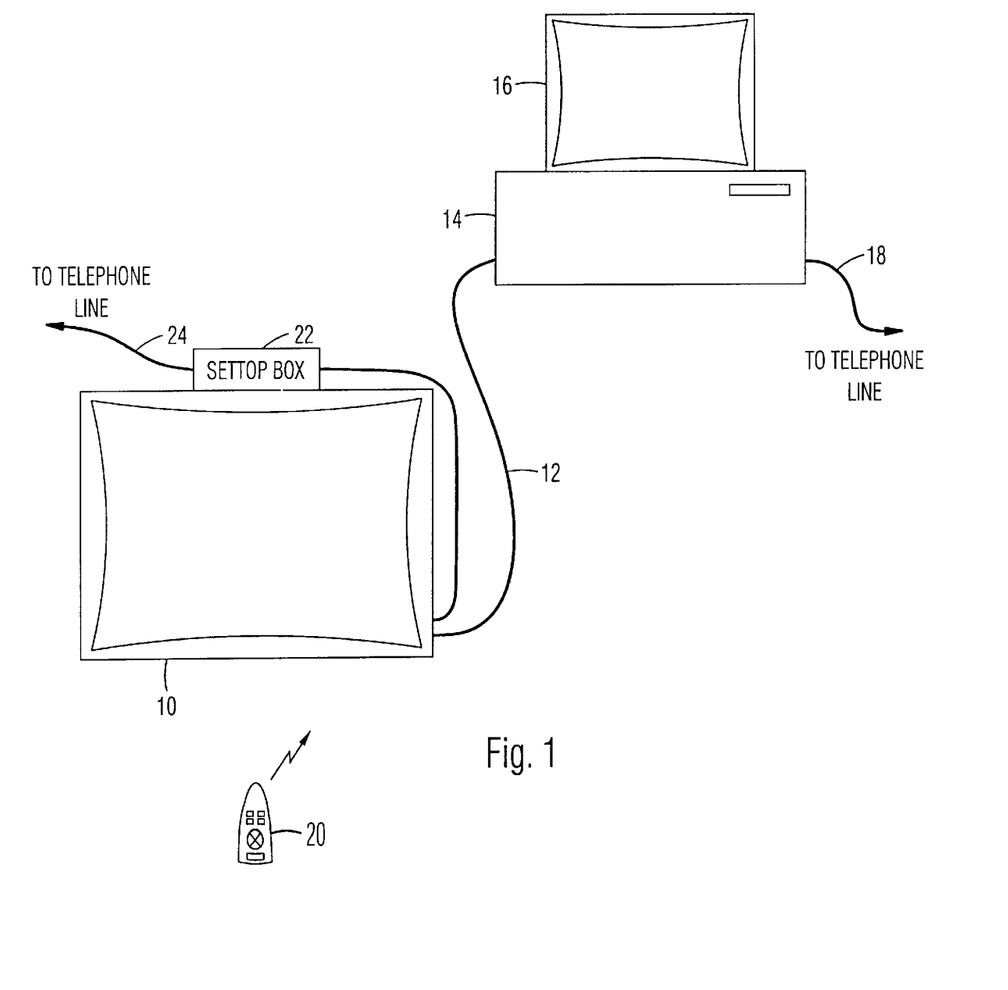
FIG. 1 illustrates a block diagram of an IEEE 1394 serial bus network including a computer system and a television with a settop box.

A block diagram of an IEEE 1394 serial bus network including a computer system and a television with an associated settop box is illustrated in FIG. 1. The computer 14 includes an associated display 16. The computer 14 is coupled to a telephone line 18. The computer 14 is also coupled to the television 10 through the IEEE 1394 serial bus network 12. The television is coupled to the settop box 22. The television 10 includes an associated remote control and input device 20. Preferably, the remote control device 20 utilizes infrared technology in order to send communications to the television 10. The settop box 22 is coupled to a telephone line 24.

Figure 2:
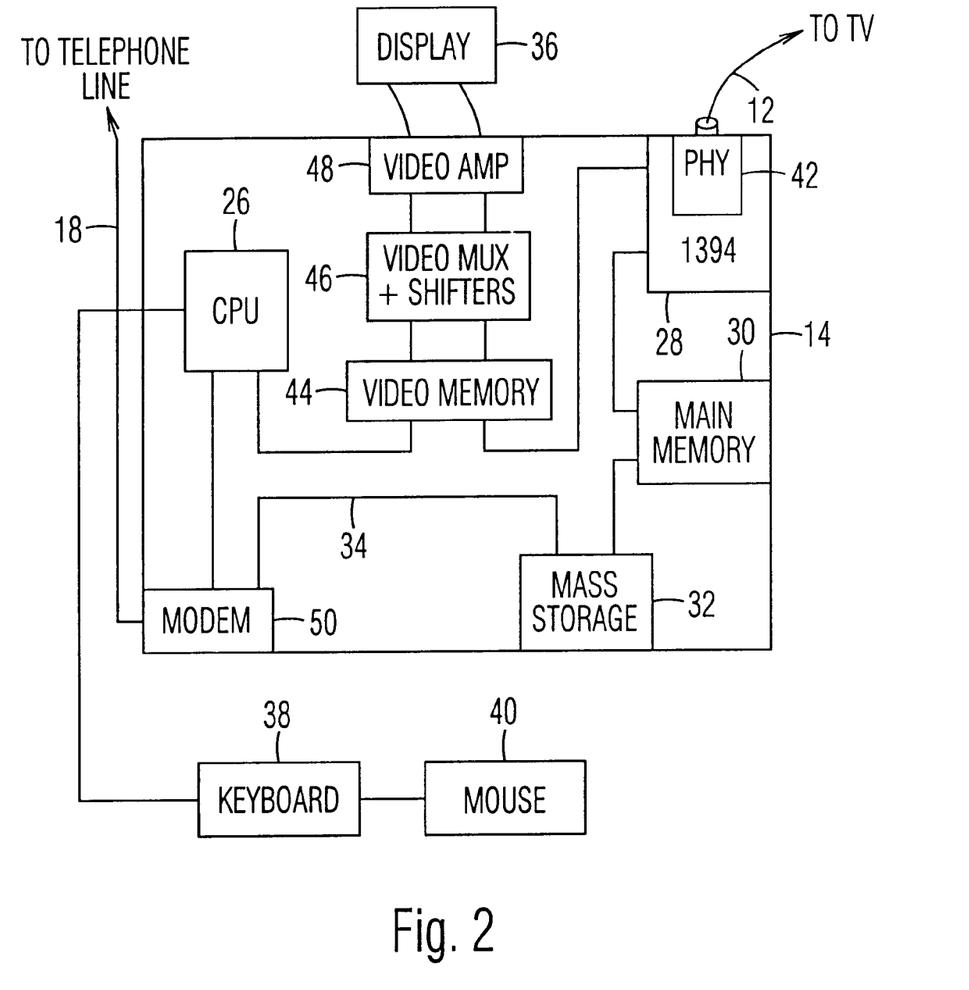
FIG. 2 illustrates a block diagram of the relevant components within the computer system of FIG. 1.

A block diagram of the internal components of the computer 14 is illustrated in FIG. 2. While the method of automatically obtaining specified web pages can be performed on any appropriate computer system or internet access device, an exemplary computer system 14 is illustrated in FIG. 2. The computer system 14 includes a central processor unit (CPU) 26, a main memory 30, a video memory 44, a mass storage device 32, a modem 50 and an IEEE 1394 interface circuit 28, all coupled together by a conventional bidirectional system bus 34. The interface circuit 28 includes the physical interface circuit 42 for sending and receiving communications on the IEEE 1394 serial bus. The physical interface circuit 42 is coupled to the television 10 over the IEEE 1394 serial bus cable 12. In the preferred embodiment of the present invention, the interface circuit 28 is implemented on an IEEE 1394 interface card within the computer system 14. However, it should be apparent to those skilled in the art that the interface circuit 28 can be implemented within the computer system 14 in any other appropriate manner, including building the interface circuit onto the motherboard itself. The modem 50 is coupled to the telephone line 18 for sending and receiving communications over the telephone line 18. The mass storage device 32 may include both fixed and removable media using any one or more of magnetic, optical or magneto-optical storage technology or any other available mass storage technology. The system bus 34 contains an address bus for addressing any portion of the memory 30 and 44. The system bus 34 also includes a data bus for transferring data between and among the CPU 26, the main memory 30, the video memory 44, the mass storage device 32, the modem 50 and the interface circuit 28.

The computer system 14 is also coupled to a number of peripheral input and output devices including the keyboard 38, the mouse 40 and the associated display 36. The keyboard 38 is coupled to the CPU 26 for allowing a user to input data and control commands into the computer system 14. A conventional mouse 40 is coupled to the keyboard 38 or computer system 14 for manipulating graphic images on the display 36 as a cursor control device in a conventional manner. The display 36 displays video and graphical images generated by the computer system 14.

A port of the video memory 44 is coupled to a video multiplex and shifter circuit 46, which in turn is coupled to a video amplifier 48. The video amplifier 48 drives the display 36, when it is being used. The video multiplex and shifter circuitry 46 and the video amplifier 48 convert pixel data stored in the video memory 44 to raster signals suitable for use by the display 36.

Figure 3:
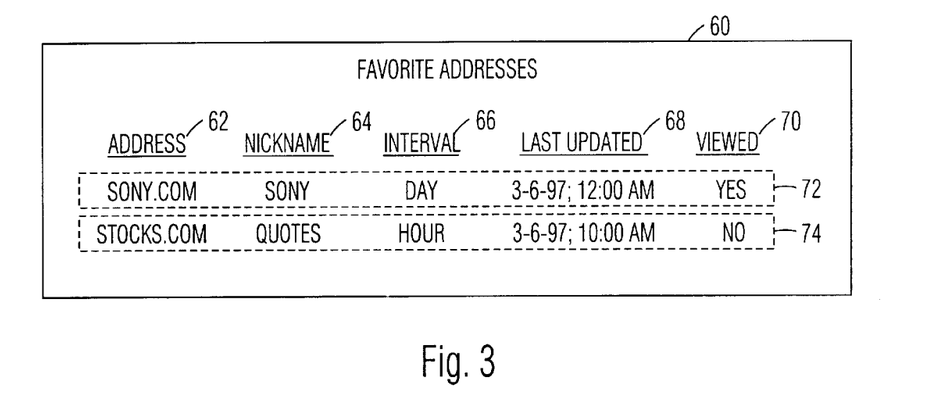
FIG. 3 illustrates a user interface page through which the user enters the addresses of the web pages to be automatically accessed by the computer system.

A user of the system uses the keyboard 38 and the mouse 40 to program the addresses of the web pages which are to be automatically downloaded by the computer system 14. A user interface through which the user programs the web page addresses is illustrated in FIG. 3. The user interface 60 includes an address column 62, a nickname column 64, an interval column 66, an update column 68 and a viewed column 70. The user programs an entry, displayed as a row in the table, using the keyboard 38 and the mouse 40 in a conventional manner. In the address column 62, the user enters the internet address of a web page which is to be automatically downloaded. In the nickname column 64, the user assigns a nickname to correspond to this address. In the interval column 66, the user assigns an interval at which the web page is to be automatically downloaded. Acceptable entries within the interval column 66 are hour, day, number of days and week. In the last updated column 68, the computer system 14 displays the date and time of the last version of the web page which was downloaded corresponding to this entry. In the viewed column 70, the computer system 14 displays either a "Yes" or "No" value, corresponding to whether or not the last downloaded web page corresponding to this entry was viewed by the user.

The user interface example illustrated in FIG. 3 includes two entries 72 and 74. The first entry 72 includes an internet address of sony.com in the address column 62, an assigned nickname of Sony in the nickname column 64 and an interval of every day in the interval column 66. The update column 68 indicates that the corresponding web page was last updated on Mar. 6, 1997 at 12:00 AM. The viewed column 70 indicates that the user has viewed the last copy of the web page which was downloaded. In response to this first entry 72, the computer system 14 will then access the web page at the internet address sony.com every day and download the available information from that page, updating the information within the update column 68 and the viewed column 70, accordingly.

The second entry 74 includes an internet address of stocks.com in the address column 62, an assigned nickname of Quotes in the nickname column 64 and an interval of every hour in the interval column 66. The update column 68 indicates that the corresponding web page was last updated on Mar. 6, 1997 at 10:00 AM. The viewed column 70 indicates that the user has not viewed the last copy of the web page which was downloaded. In response to this second entry 74, the computer system 14 will then access the web page at the internet address stocks.com every hour and download the available information from that page, updating the information within the update column 68 and the viewed column 70, accordingly.

After the user has programmed at least one entry into the user interface 60, the computer system 14 (FIG. 2) will then retrieve the specified web page or pages at the specified intervals. For example, in response to the first entry 72 (FIG. 3), the computer system 14 (FIG. 2) will on a daily interval, use the modem 50 (FIG. 2), to connect to the user's internet service provider through the telephone line 18 (FIG. 2). Once connected to the internet service provider, the computer system 14 (FIG. 2) will then automatically enter the address sony.com corresponding to the first entry 72 (FIG. 2). After being connected to the web page at that address by the internet service provider, the computer system 14 (FIG. 2) will download the available information from that web page, essentially making a reproduction of the information within the web page. The available information from that web page is downloaded through the telephone line 18 (FIG. 2) and the modem 50 (FIG. 2) and preferably stored on the mass storage device 32 (FIG. 2) within the computer system 14 (FIG. 2). Alternatively, the available information from that web page is stored in the main memory 30 (FIG. 2). Preferably, as a downloaded web page is updated by the computer system 14 (FIG. 2), only the latest version of that downloaded web page is saved in the mass storage device 32 (FIG. 2). Alternatively, each downloaded version of the web page can be saved until it is viewed by the user. In this alternative embodiment, after the web page is viewed by the user it will then be erased from the computer system's 14 (FIG. 2) memory.

After a web page is downloaded, a copy of the web page is in the memory of the computer 14 (FIG. 2) and available to the user. The user can then access that previously downloaded web page by opening the user interface 60 (FIG. 3) and using the mouse 40 (FIG. 2) or other input device to select the corresponding entry. If the user is interested in viewing the last downloaded web page corresponding to the first entry 72 (FIG. 3), then the user opens the user interface 60 (FIG. 3) and selects the first entry 72 (FIG. 3). The computer system 14 (FIG. 2) will then load the available information for that web page from the mass storage device 32 (FIG. 2) into the main memory 30 (FIG. 2) and display the web page on the display 36 (FIG. 2). The user can then access the available information on the downloaded web page as if they were actually accessing the original web page. However, the user will not be able to utilize any links to other internet addresses included within the web page, because the computer system 14 (FIG. 2) is not actually connected to the internet through the internet service provider. If there is any information in the web page which is interesting to the user, the user can then instruct the computer system 14 (FIG. 2) to connect to the internet service provider and view the actual web page. Once connected to the actual web page through their internet service provider, the user then has the ability to automatically jump to any links included within the actual web page.

A user who only interested in the actual information included on the downloaded web page, can save a great amount of time by viewing the downloaded web page and not waiting through the delays associated with accessing the original web page on the internet. Using the system of the present invention, the user allows the computer system 14 (FIG. 2) to automatically perform the time consuming task of accessing and downloading the specified web page. The user can then quickly open the downloaded web page and view it in a fraction of the time it would take to access the web page and view it over the internet. If the user then decides that they would like to connect to the actual web page, based on the downloaded information, they have still saved a lot of time by viewing the downloaded web page to determine if there is anything on the actual web page that is of interest. The user will save even more time, when all the information of interest is included on the downloaded web page which has been automatically obtained by the computer system 14 (FIG. 2).

While preferably, the computer system 14 (FIG. 2) is used to enter the appropriate information into the user interface 60 (FIG. 3) and automatically download specified web pages from the internet, it should be apparent to those skilled in the art that the combination of the settop box 22 (FIG. 1), television 10 (FIG. 1) and remote control input device 20 (FIG. 1), or any other appropriate internet access device, can also be used to perform the tasks associated with the present invention. In this manner, both the computer system 14 (FIG. 2) and the television 10 (FIG. 1) with settop box 22 (FIG. 1) can be used independently to automatically download specified web pages from the internet. Alternatively, the computer system 14 (FIG. 2) can be used to automatically download the specified web pages as described above and the information accessed by the user through the television 10 (FIG. 1). In this embodiment, the television obtains the downloaded information from the computer system 14 (FIG. 2) via the IEEE 1394 serial bus 12 (FIG. 1). This downloaded information is then displayed for the user on the television 10 (FIG. 1).

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method of automatically accessing web page information from internet addresses comprising the steps of:
    a. automatically accessing web page information at a specified internet address;
    b. downloading the web page information from the specified internet address; and
    c. storing the web page information in order to allow a user to access the web page information while not connected to the specified internet address.

2. The method as claimed in claim 1 further comprising the step of forming a connection between a system capable of accessing a remote internet server and the remote internet server.

3. The method as claimed in claim 2 wherein the steps of automatically accessing and downloading are performed periodically at predetermined intervals.

4. The method as claimed in claim 3 wherein the system is a computer system.

5. The method as claimed in claim 4 wherein the computer system includes a memory device for storing the web page information.

6. The method as claimed in claim 5 further comprising the step of erasing a previous version of the web page information when a more recent version of the web page information is obtained.

7. A method of automatically accessing web page information from internet addresses comprising the steps of:
    a. forming a connection between a system capable of accessing a remote internet server and the remote internet server;
    b. automatically accessing web page information at a specified internet address; and c. downloading the web page information from the specified internet address to the system.

8. The method as claimed in claim 7 further comprising the step of storing the web page information.

9. The method as claimed in claim 8 further comprising the step of providing the web page information to a user.

10. The method as claimed in claim 8 further comprising the step of erasing a previous version of the web page information when a more recent version of the web page information is obtained.

11. The method as claimed in claim 8 wherein the system is a computer system including a memory device for storing the web page information.

12. The method as claimed in claim 8 wherein the steps of forming a connection, automatically accessing and downloading are performed periodically at predetermined intervals.

13. An apparatus for automatically accessing web page information from internet addresses and providing the web page information to a user comprising:
 a. a connection device configured for coupling to an internet server for forming a connection between the apparatus and the internet server; and
 b. a controller coupled to the connection device for controlling the operation of the connection device to automatically form the connection between the apparatus and the internet server and download the web page information through the connection device from specified internet addresses.

14. The apparatus as claimed in claim 13 wherein the connection device is a modem.

15. The apparatus as claimed in claim 14 wherein the connection is formed over a telephone line.

16. The apparatus as claimed in claim 13 further comprising a memory device coupled to the connection for storing the web page information.

17. The apparatus as claimed in claim 16 further comprising a display device for displaying the web page information.

18. The apparatus as claimed in claim 17 further comprising means for programming coupled to the controller for entering the specified internet addresses.

19. The apparatus as claimed in claim 18 wherein the controller and the connection device automatically download the web page information periodically at predetermined intervals.

20. A computer system for automatically accessing web page information from internet addresses and providing the web page information to a user comprising:
 a. a modem configured for coupling to a telephone line for forming a connection between the computer system and internet servers;
 b. a controller coupled to the modem for controlling the modem to automatically form the connection between the computer system and the internet servers and download the web page information from specified internet addresses; and
 c. a storage device coupled to the modem for storing the web page information.

21. The computer system as claimed in claim 20 further comprising a display device for displaying the web page information.

22. The computer system as claimed in claim 21 wherein the controller and the modem automatically download the web page information periodically at predetermined intervals.

23. The computer system as claimed in claim 22 wherein the storage device is a hard disk drive.

\* \* \* \* \*

(12) EX PARTE REEXAMINATION CERTIFICATE (5164th)
United States Patent
Mano et al.

(10) Number: US 5,978,807 C1
(45) Certificate Issued: Jul. 26, 2005

(54) APPARATUS FOR AND THE METHOD OF AUTOMATICALLY DOWNLOADING AND STORING INTERNET WEB PAGES

(75) Inventors: Yoshizumi Mano, Cupertino, CA (US); Chenchu Chilamakuri, Fremont, CA (US); Hisato Shima, Saratoga, CA (US)

(73) Assignees: Sony Corporation, Tokyo (JP); Sony Electronics, Inc., Park Ridge, NJ (US)

Reexamination Request:
No. 90/005,622, Mar. 3, 2000

Reexamination Certificate for:
Patent No.: 5,978,807
Issued: Nov. 2, 1999
Appl. No.: 08/941,583
Filed: Sep. 30, 1997

(51) Int. Cl.⁷ .............................. G06F 17/30
(52) U.S. Cl. ................. 707/10; 707/2; 707/104.1; 715/500.1; 715/513; 715/500
(58) Field of Search ............... 707/2, 10, 102; 709/200; 395/200.31

(56) References Cited

U.S. PATENT DOCUMENTS

| | | | | |
|---|---|---|---|---|
| 5,561,457 A | * | 10/1996 | Cragun et al. | 348/461 |
| 5,732,074 A | * | 3/1998 | Spaur et al. | 370/313 |
| 5,768,517 A | * | 6/1998 | Kassatly | 700/233 |
| 5,809,242 A | * | 9/1998 | Shaw et al. | 395/200.47 |
| 5,890,166 A | * | 3/1999 | Eisenberg et al. | 707/203 |
| 5,925,103 A | * | 7/1999 | Magallanes et al. | 709/230 |
| 5,931,904 A | * | 8/1999 | Banga et al. | 341/55 |
| 5,933,811 A | * | 8/1999 | Angles et al. | 705/14 |
| 5,973,696 A | * | 10/1999 | Agranat et al. | 345/760 |
| 6,038,601 A | * | 3/2000 | Lambert et al. | 709/226 |
| 6,044,205 A | * | 3/2000 | Reed et al. | 395/200.31 |
| 6,049,821 A | * | 4/2000 | Theriault et al. | 709/203 |
| 6,058,250 A | * | 5/2000 | Harwood et al. | 395/200.57 |
| 6,070,184 A | * | 5/2000 | Blount et al. | 709/200 |
| 6,112,024 A | * | 8/2000 | Almond et al. | 707/203 |
| 6,138,141 A | * | 10/2000 | DeSimone et al. | 707/10 |
| 6,157,935 A | * | 12/2000 | Tran et al. | 715/503 |
| 6,182,122 B1 | * | 1/2001 | Berstis | 709/203 |

OTHER PUBLICATIONS

Kunzman et al (Kunzman), 1394 High Performance Serial Bus: The Digital Interface for ATV, IEEE Transactions on Consumer Electronics, vol. 41, No. 3, Aug. 1995.*

Feingold, Fundamentals of COBOL Programming, Wm. C. Brown Company, 1969, pp. 131–135.*

Seybold Publications, Inc., Editorial Aid—The Offline Browser, The Seybold Report On Desktop Publishing, v.10, n.11, p. 24 (3 pages), Jul. 1996.*

Perenson, Your Web Surfing Companion, PC Magazine, v.15, n.15, p. 73, Sep. 1996.*

* cited by examiner

*Primary Examiner*—Wayne Amsbury (57) ABSTRACT

A computer system or other internet access device is programmed to automatically access specified web pages periodically and download the information from the web page to the computer system. Through a user interface, a user programs the computer system by entering an internet address of the web page and an access interval. The access interval is the interval at which versions of the web page will be downloaded; e.g. hourly, daily or weekly. On that periodic basis the computer system or other internet access device then automatically accesses the specified web page and downloads the available information. This information is stored within a memory device associated with the computer system. The user can then access the downloaded information and view the web page without connecting to the internet to determine if there is anything of interest to the user on the web page. If there is information of interest and the user would like to obtain additional information, the user can then access the appropriate web page at a convenient time to obtain the additional information.

FAVORITE ADDRESSES

| ADDRESS / 62 | NICKNAME / 64 | INTERVAL / 66 | LAST UPDATED / 68 | VIEWED / 70 |
|---|---|---|---|---|
| SONY.COM | SONY | DAY | 3-6-97; 12:00 AM | YES |
| STOCKS.COM | QUOTES | HOUR | 3-6-97; 10:00 AM | NO |

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–12, 19 and 22 are cancelled.

Claims 13, 17, 18, 20, 21 and 23 are determined to be patentable as amended.

Claims 14, 15 and 16, dependent on an amended claim, are determined to be patentable.

New claims 24–71 are added and determined to be patentable.

13. An apparatus for automatically accessing web page information from internet addresses and providing the web page information to a user comprising:
   a. a connection device configured for coupling to an internet server for forming a connection between the apparatus and the internet server; and
   b. a controller coupled to the connection device *within the apparatus* for controlling the operation of the connection device to automatically form the connection between the apparatus and the internet server *without the user's immediate direction,* and *automatically* download the web page information through the connection device from specified internet addresses *in response to one or more web page entries, wherein each web page entry includes:*
      *i. an address column including the specified internet address entered by the user;*
      *ii. a nickname column including an identifying name representing the internet address, entered by the user;*
      *iii. an interval column including a periodic access interval value representing a frequency at which the internet address is automatically accessed, entered by the user;*
      *iv. a last updated column including a time value representing when the internet address was last automatically accessed wherein the time value is updated by the controller; and*
      *v. a viewed column including a designation representing whether or not the web page information has been viewed by the user wherein the designation is updated by the controller;*
      *and further wherein the controller and the connection device automatically download the web page information at predetermined periodic intervals specified by the access interval and update the time value and the designation within the viewed column.*

17. The apparatus as claimed in claim 16 further comprising a display device for displaying the web page information *and the web page entries*.

18. The apparatus as claimed in claim 17 further comprising means for programming coupled to the controller for entering the *web page entries including the* specified internet addresses *and corresponding access intervals*.

20. A computer system for automatically accessing web page information from internet addresses and providing the web page information to a user comprising:
   a. a modem configured for coupling to a telephone line for forming a connection between the computer system and internet servers;
   b. a controller coupled to the modem *within the computer system* for controlling the modem to automatically form the connection between the computer system and the internet servers *without the user's immediate direction,* and *automatically* download the web page information from specified internet addresses *in response to one or more web page entries, wherein each web page entry includes:*
      *i. an address column including the specified internet address entered by the user;*
      *ii. a nickname column including an identifying name representing the internet address, entered by the user;*
      *iii. an interval column including a periodic access interval value representing a frequency at which the internet address is automatically accessed, entered by the user;*
      *iv. a last updated column including a time value representing when the internet address was last automatically accessed wherein the time value is updated by the controller; and*
      *v. a viewed column including a designation representing whether or not the web page information has been viewed by the user wherein the designation is updated by the controller;*
      *and further wherein the controller and the modem automatically download the web page information at predetermined periodic intervals specified by the access interval and update the time value and the designation within the viewed column;* and
   c. a storage device coupled to the modem for storing the web page information.

21. The computer system as claimed in claim 20 further comprising a display device for displaying the web page information *and the web page entries*.

23. The computer system as claimed in claim [22] *21* wherein the storage device is a hard disk drive.

*24. An internet access device for automatically accessing web page information from internet addresses and providing the web page information to a user comprising:*
   *a. a connection device configured for coupling to an internet server for forming a connection between the internet access device and the internet server;*
   *b. a controller coupled to the connection device within the internet access device for controlling the operation of the connection device to automatically form the connection between the internet access device and the internet server without the user's immediate direction, and automatically download the web page information through the connection device from specified internet addresses at predetermined periodic intervals, wherein the predetermined periodic intervals are specified by an access interval within one or more web page entries; and*
   *c. an interface coupled to the connection device and the controller and configured for coupling to a display* device for displaying the web page information at the display device and the web page entries, wherein each web page entry includes:
  i. an address column including the specified internet address entered by the user;
  ii. a nickname column including an identifying name representing the internet address, entered by the user;
  iii. an interval column including the access interval representing a frequency at which the internet address is automatically accessed, entered by the user;
  iv. a last updated column including a time value representing when the internet address was last automatically accessed wherein the time value is updated by the controller; and
  v. a viewed column including a designation representing whether or not the web page information has been viewed by the user wherein the designation is updated by the controller.

25. The internet access device as claimed in claim 24 further comprising a storage device coupled to the connection device and to the interface for storing the web page information.

26. The internet access device as claimed in claim 25 wherein the storage device is a hard disk drive.

27. The internet access device as claimed in claim 24 wherein the interface is further configured for monitoring and initiating the download of the web page information from the specified internet addresses and updating the time value and the designation within the viewed column.

28. A settop box for automatically accessing web page information from internet addresses and providing the web page information to a user comprising:
  a. a connection device configured for coupling to an internet server for forming a connection between the settop box and the internet server;
  b. a controller coupled to the connection device within the settop box for controlling the operation of the connection device to automatically form the connection between the settop box and the internet server without the user's immediate direction, and automatically download the web page information through the connection device from specified internet addresses at predetermined periodic intervals, wherein the predetermined periodic intervals are specified by an access interval within one or more web page entries; and
  c. an interface coupled to the connection device and the controller and configured for coupling to a display device for displaying the web page information at the display device and the web page entries, wherein each web page entry includes:
    i. an address column including the specified internet address entered by the user;
    ii. a nickname column including an identifying name representing the internet address, entered by the user;
    iii. an interval column including the access interval representing a frequency at which the internet address is automatically accessed, entered by the user;
    iv. a last updated column including a time value representing when the internet address was last automatically accessed wherein the time value is updated by the controller; and
    v. a viewed column including a designation representing whether or not the web page information has been viewed by the user wherein the designation is updated by the controller.

29. The settop box as claimed in claim 28 wherein the web page information is automatically downloaded through the connection device from the specified internet addresses at the predetermined periodic intervals specified by the one or more web page entries.

30. The settop box as claimed in claim 28 further comprising a storage device coupled to the connection device and to the interface for storing the web page information.

31. The settop box as claimed in claim 30 wherein the storage device is a hard disk drive.

32. The settop box as claimed in claim 28 wherein the interface is further configured for monitoring and initiating the download of the web page information from the specified internet addresses and updating the time value and the designation within the viewed column.

33. A network of devices for automatically accessing web page information from internet addresses and providing the web page information to a user comprising:
  a. a first device including:
    i. a connection device configured for coupling to an internet server based on connection information for forming a connection between the first device and the internet server; and
    ii. a controller coupled to the connection device within the first device for controlling the operation of the connection device to automatically form the connection between the first device and the internet server without the user's immediate direction, and automatically download the web page information through the connection device from specified internet addresses at predetermined periodic intervals, wherein the predetermined periodic intervals are specified by an access interval within one or more web page entries; and
  b. a second device coupled to the first device and including a display device for providing a graphical user interface to the user for displaying the web page information to the user, wherein each of the web page entries includes:
    i. an address column including the specified internet address entered by the user;
    ii. a nickname column including an identifying name representing the internet address, entered by the user;
    iii. an interval column including the access interval value representing a frequency at which the internet address is automatically accessed, entered by the user;
    iv. a last updated column including a time value representing when the internet address was last automatically accessed wherein the time value is updated by the controller; and
    v. a viewed column including a designation representing whether or not the web page information has been viewed by the user wherein the designation is updated by the controller.

34. The network as claimed in claim 33 further comprising a memory device coupled to the connection device for storing the web page information.

35. The network as claimed in claim 34 wherein the memory device is included within the first device.

36. The network as claimed in claim 33 wherein the second device is coupled to the first device by an IEEE 1394 serial bus.

37. The network as claimed in claim 33 wherein the first device is a settop box.

38. The network as claimed in claim 33 wherein the second device is a television.

39. A graphical user interface at a device remote from an internet server, for monitoring and controlling automatic accesses of web page information from an internet address contained within a web page entry comprising:
   a. an address column including an internet address entered by a user;
   b. a nickname column including an identifying name representing the internet address, entered by the user;
   c. an interval column including a periodic interval value representing a frequency at which the internet address is automatically accessed, entered by the user;
   d. a last updated column including a time value representing when the internet address was last automatically accessed wherein the time value is updated by the graphical user interface; and
   e. a viewed column including a designation representing whether or not the web page information has been viewed by the user wherein the designation is updated by the controller.

40. The graphical user interface as claimed in claim 39 wherein the graphical user interface is displayed on a computer system having a display, a memory and an input device.

41. A method of downloading world-wide-web information from an internet address, the method comprising the steps of:
   a. receiving one or more web page entries each including at least one predetermined internet address associated with at least one predetermined periodic access interval, wherein each web page entry includes:
      i. an address column including the predetermined internet address entered by a user;
      ii. a nickname column including an identifying name representing the internet address, entered by the user;
      iii. an interval column including the predetermined periodic access interval value representing a frequency at which the internet address is automatically accessed, entered by the user;
      iv. a last updated column including a time value representing when the internet address was last automatically accessed wherein the time value is updated by a controller; and
      v. a viewed column including a designation representing whether or not the web page information has been viewed by the user wherein the designation is updated by the controller;
   b. accessing the at least one predetermined internet address by connecting a remote internet server and an internet access system capable of connecting to the remote internet server;
   c. downloading web page information from the at least one predetermined internet address for providing downloaded web page information;
   d. storing the downloaded web page information for use by the user when the system is not connected to the remote internet server; and
   e. performing one of the following if there is prior downloaded web page information having the same internet address as the downloaded web page information:
      i. continuing to save the prior downloaded web page information at least until it is viewed by the user; and
      ii. replacing the prior downloaded web page information with the downloaded web page information when the downloaded web page information is stored;
   wherein the steps are performed automatically at the internet access system without the user's immediate direction, based on the at least one predetermined access interval included within the one or more entries.

42. The method of claim 41 further comprising the step of automatically updating the time value by providing at least one update time corresponding to when the web page information associated with the at least one predetermined internet address is updated.

43. The method of claim 41 further comprising the step of automatically updating the designation by providing viewing status information associated with at least one of the downloaded web page information and the prior downloaded web page information.

44. The method of claim 41 wherein the at least one predetermined access interval is one of an hourly interval, a daily interval and a weekly interval.

45. The method of claim 41 wherein the steps are performed using a network arrangement, including a settop arrangement and a computer.

46. The method of claim 41 further comprising the step of providing a user interface, wherein the user interface is used to provide the web page entries.

47. The method of claim 41 wherein in the web page entries, the at least one predetermined internet address, the address column, the nickname column, the interval column, the last updated column and the viewed column are provided in a columnar form.

48. A settop arrangement for downloading world-wide-web information from an internet address, the settop arrangement comprising:
   a. an arrangement for automatically performing the following operations at the settop arrangement without a user's immediate direction, based on a predetermined access interval specified by an access interval value within a web page entry;
      i. receiving one or more web page entries including at least one predetermined internet address associated with the at least one predetermined periodic access interval, each of the web page entries including:
         A. an address column including the predetermined internet address entered by the user;
         B. a nickname column including an identifying name representing the internet address, entered by the user;
         C. an interval column including the predetermined periodic access interval value representing a frequency at which the internet address is automatically accessed, entered by the user;
         D. a last updated column including a time value representing when the internet address was last automatically accessed wherein the time value is updated by the arrangement; and
         E. a viewed column including a designation representing whether or not the web page information has been viewed by the user wherein the designation is updated by the arrangement;
      ii. accessing the at least one predetermined internet address by connecting to a remote internet server;
      iii. downloading web page information from the at least one predetermined internet address for providing downloaded web page information;
      iv. performing one of the following if there is prior downloaded web page information having the same internet address as the downloaded web page information:

continuing to save the prior downloaded web page information at least until it is viewed by the user, and replacing the prior downloaded web page information with the downloaded web page information when the downloaded web page information is stored;

b. a memory for storing the downloaded web page information for use by the user when the arrangement is not connected to the remote internet server; and c. a coupling arrangement for coupling the arrangement to a television for displaying the downloaded web page information.

49. A network system for downloading world-wide-web information from an internet address, the network system comprising:

a. a computer for connecting to a remote internet server and for automatically performing the following operations at the computer without a user's immediate direction, based on a predetermined access interval specified by an access interval value within a web page entry:

i. receiving one or more web page entries including at least one predetermined internet address associated with the at least one predetermined periodic access interval, each of the web page entries including:

A. an address column including the predetermined internet address entered by the user;

B. a nickname column including an identifying name representing the internet address, entered by the user;

C. an interval column including the predetermined periodic access interval value representing a frequency at which the internet address is automatically accessed, entered by the user;

D. a last updated column including a time value representing when the internet address was last automatically accessed wherein the time value is updated by the computer; and E. a viewed column including a designation representing whether or not the web page information has been viewed by the user wherein the designation is updated by the computer;

ii. accessing the at least one predetermined internet address by connecting the computer to a remote internet server;

iii. downloading web page information from the at least one predetermined internet address for providing downloaded web page information;

iv. storing the downloaded web page information for use by the user;

b. a digital interface and coupling arrangement for coupling the computer to a television for displaying the downloaded web page information;

c. a settop arrangement; and d. a coupling arrangement for coupling the settop arrangement to the television for displaying web information.

50. A network system for downloading world-wide-web information from an internet address, the network system comprising:

a. a settop arrangement for connecting to a remote internet server and for automatically performing the following operations at the settop arrangement without a user's immediate direction, based on a predetermined periodic access interval specified by an access interval value within a web page entry:

i. receiving one or more web page entries including at least one predetermined internet address associated with the at least one predetermined access interval, each of the web page entries including:

A. an address column including the predetermined internet address entered by the user;

B. a nickname column including an identifying name representing the internet address, entered by the user;

C. an interval column including the predetermined periodic access interval value representing a frequency at which the internet address is automatically accessed, entered by the user;

D. a last updated column including a time value representing when the internet address was last automatically accessed wherein the time value is updated by the settop arrangement; and E. a viewed column including a designation representing whether or not the web page information has been viewed by the user wherein the designation is updated by the settop arrangement;

ii. accessing the at least one predetermined internet address by connecting the settop arrangement to the remote internet server;

iii. downloading web page information from the at least one predetermined internet address for providing downloaded web page information;

iv. storing the downloaded web page information for use by the user;

b. a coupling arrangement for coupling the settop arrangement to a television for displaying the downloaded web page information;

c. a computer; and d. a digital interface and coupling arrangement for coupling the computer to the television for displaying web information.

51. A network system for downloading world-wide-web information from an internet address, the network system comprising:

a. a computer for connecting to a remote internet server and for coupling to a television for displaying downloaded web page information;

b. a settop arrangement for connecting to another remote internet server and for coupling to the television for displaying another downloaded web page information; wherein the computer and the settop arrangement are each configured for automatically and independently performing the following operations based on a predetermined access interval:

i. obtaining at least one predetermined internet address associated with the at least one predetermined access interval;

ii. accessing the at least one predetermined internet address by connecting to one of the remote internet server and the another remote internet server;

iii. downloading the web page information from the at least one predetermined internet address for providing one of the downloaded web page information and the another downloaded web page information; and iv. storing one of the downloaded web page information and the another downloaded web page information for use by a user.

52. The network system of claim 51 further comprising:

a. a digital interface and coupling arrangement for coupling the computer to the television for displaying the downloaded web page information; and b. a coupling arrangement for coupling the settop arrangement to the television for displaying the another downloaded web page information.

53. The network system of claim 52 wherein the digital interface and coupling arrangement includes an IEEE 1394 serial bus.

54. The network system of claim 51 wherein the computer and the settop arrangement are each programmed for automatically and independently performing at least one of the following if there is prior downloaded web page information having the same internet address as the downloaded web page information:
 a. continuing to save the prior downloaded web page information at least until it is viewed by the user; and
 b. replacing the prior downloaded web page information with the downloaded web page information when the downloaded web page information is stored.

55. The network system of claim 51 wherein the computer and the settop arrangement are each programmed for automatically and independently providing at least one update time corresponding to when the web page information associated with the at least one predetermined internet address is updated.

56. The network system of claim 51 wherein the computer and the settop arrangement are each programmed for automatically and independently providing viewing status information associated with at least one of the downloaded web page information and the prior downloaded web page information.

57. The network system of claim 51 wherein the computer and the settop arrangement are each programmed for automatically and independently providing a user interface, wherein the user interface provides at least two of:
 the at least one predetermined internet address;
 the at least one predetermined access interval;
 at least one alternate name for the at least one predetermined internet address;
 viewing status information associated with at least one of the downloaded web page information and the prior downloaded web page information; and
 at least one update time.

58. The network system of claim 51 wherein the computer and the settop arrangement are each programmed for:
 a. automatically providing at least one update time corresponding to when the web page information associated with the at least one predetermined internet address is updated;
 b. automatically providing viewing status information associated with at least one of the downloaded web page information and the prior downloaded web page information; and
 c. providing a user interface, wherein the user interface provides:
  the at least one predetermined internet address;
  the at least one predetermined access interval;
  at least one alternate name for the at least one predetermined internet address;
  the viewing status information associated with at least one of the downloaded web page information and the prior downloaded web page information; and
  the at least one update time.

59. A system remote from an internet server for downloading world-wide-web information from an internet address, the system comprising:
 a. means for receiving one or more web page entries each including:
  i. an address column including a predetermined internet address entered by a user;
  ii. a nickname column including an identifying name representing the internet address, entered by the user;
  iii. an interval column including a predetermined periodic access interval value representing a frequency at which the internet address is automatically accessed, entered by the user;
  iv. a last updated column including a time value representing when the internet address was last automatically accessed wherein the time value is updated by the system; and
  v. a viewed column including a designation representing whether or not the web page information has been viewed by the user wherein the designation is updated by the system;
 b. means for automatically accessing the at least one predetermined internet address by connecting the system to a remote internet server without the user's immediate direction, based on the at least one predetermined access interval;
 c. means for automatically downloading web page information from the at least one predetermined internet address for providing downloaded web page information;
 d. means for automatically storing the downloaded web page information for use by the user when the means for automatically accessing is not connected to the remote internet server; and
 e. means for automatically performing one of the following operations if there is prior downloaded web page information having the same internet address as the downloaded web page information:
  i. continuing to save the prior downloaded web page information at least until it is viewed by the user; and
  ii. replacing the prior downloaded web page information with the downloaded web page information when the downloaded web page information is stored.

60. The system of claim 59 further comprising means for automatically updating the time value by providing at least one update time corresponding to when the web page information associated with the at least one predetermined internet address is updated.

61. The system of claim 59 further comprising means for automatically updating the designation by providing viewing status information associated with at least one of the downloaded web page information and the prior downloaded web page information.

62. A computer program installed in a computer for causing an internet browser to connect to the internet to access web page information from internet addresses, and to allow a user to view the web page information through the internet browser at a later time while the internet browser is not connected to the internet, the computer program to perform:
 a. receiving and maintaining an address column including an internet address, a nickname column including an identifying name representing the internet address and an interval column including a periodic interval value representing a frequency at which the internet address is automatically accessed, wherein the internet address, the identifying name and the periodic interval value are entered by the user; and
 b. entering the internet address into the internet browser and causing the internet browser to access the web page information from the internet address at the frequency represented by the periodic interval value; wherein in response to the internet address and the periodic interval value the computer program causes the internet browser to automatically initiate the access of web page information at the specified internet address from the computer without the user's immediate direction, automatically download the web page information from the specified internet address to the computer, store the web page information in order to allow the user to access the web page information while not connected to the specified internet address and perform the steps of automatically initiating, automatically downloading and storing at the computer at predetermined periodic intervals specified by the periodic interval value and further wherein the internet browser enters a time value into a last updated column representing when the internet address was last automatically accessed and enters a designation into a viewed column representing whether or not the web page information has been viewed by the user.

63. The computer program as claimed in claim 62 wherein the computer has a display, a memory and an input device for displaying the internet browser.

64. A computer program installed in a computer for causing an internet browser to connect to the internet to access web page information from internet addresses and to allow a user to view the web page information through the internet browser, offline, at a later time while the internet browser is not connected to the internet, the computer program to perform:

a. entering a web page entry into the internet browser including an address column having a specified internet address, an interval column including a periodic access interval value specifying a predetermined periodic interval at which the web page information is to be accessed and a nickname column including an identifying name representing the internet address wherein the internet address, the identifying name and the periodic access interval value are entered by the user; and b. displaying the web page information specified in the access entry offline, through the internet browser after the internet browser has downloaded the web page information;

wherein the internet browser automatically initiates the access of web page information at the specified internet address from the computer without the user's immediate direction, automatically downloads the web page information from the specified internet address to the computer, stores the web page information in order to allow the user to access the web page information while not connected to the specified internet address and perform the steps of automatically initiating, automatically downloading and storing at the computer at predetermined periodic intervals specified by the periodic access interval value and further wherein the internet browser enters a time value into a last updated column corresponding to the web page entry, the time value representing when the internet address was last automatically accessed and further wherein the internet browser enters a designation into a viewed column into a viewed column corresponding to the web page entry, the designation within the viewed column representing whether or not the web page information has been viewed by the user.

65. The computer program as claimed in claim 64 wherein the computer has a display, a memory and an input device for displaying the internet browser.

66. A method of programming an internet browser to access web page information from internet addresses at a user computer system to allow a user to view the web page information through the internet browser at a later time while the internet browser is not connected to the internet comprising:

a. entering into the internet browser by the user an address column including an internet address;

b. entering into the internet browser by the user a nickname column including an identifying name representing the internet address; and c. entering into the internet browser by the user an interval column including a periodic interval value representing a frequency at which the internet address is automatically accessed;

wherein in response to the internet address and the periodic interval value the internet browser automatically initiates the access of web page information at the specified internet address from the user computer system without the user's immediate direction, automatically downloads the web page information from the specified internet address to the user computer system, stores the web page information in order to allow the user to access the web page information while not connected to the specified internet address and performs the steps of automatically initiating, automatically downloading and storing at the user computer system at predetermined periodic intervals specified by the periodic interval value and further wherein the browser enters a time value into a last updated column representing when the internet address was last automatically accessed and enters a designation into a viewed column representing whether or not the web page information has been viewed by the user.

67. The method as claimed in claim 65 wherein the internet browser is resident on and displayed on a computer system having a display, a memory and an input device.

68. A method of utilizing an internet browser to access web page information from internet addresses at a user computer system to allow a user to view the web page information through the internet browser, offline, at a later time while the internet browser is not connected to the internet comprising:

a. entering a web page entry into the internet browser including an address column having a specified internet address, an interval column including a periodic access interval value specifying a predetermined periodic interval at which the web page information is to be accessed and a nickname column including an identifying name representing the internet address wherein the internet address, the identifying name and the periodic access interval value are entered by the user; and b. viewing the web page information specified in the web page entry offline, through the internet browser after the internet browser has downloaded the web page information;

wherein the internet browser automatically initiates the access of web page information at the specified internet address from the user computer system without the user's immediate direction, automatically downloads the web page information from the specified internet address to the user computer system, stores the web page information in order to allow the user to access the web page information while not connected to the specified internet address and performs the steps of automatically initiating, automatically downloading and storing at the user computer system at predetermined periodic intervals specified by the periodic access interval value and further wherein the internet browser enters a time value into a last updated column corresponding to the web page entry, the time value representing when the internet address was last automatically accessed and further wherein the internet browser enters a designation into a viewed column corresponding to the web page entry, the designation within the viewed column representing whether or not the web page information has been viewed by the user.

69. The method as claimed in claim 68 wherein the internet browser is resident on and displayed on a computer system having a display, a memory and an input device.

70. An internet browser to access web page information from internet addresses at a user computer system to allow a user to view the web page information through the internet browser at a later time while the internet browser is not connected to the internet, the internet browser comprising a graphical user interface for monitoring and controlling automatic accesses of web page information from an internet address contained within a web page entry comprising:

a. an address column including an internet address entered by the user;

b. a nickname column including an identifying name representing the internet address, entered by the user;

c. an interval column including a periodic interval value representing a frequency at which the internet address is automatically accessed, entered by the user;

d. a last updated column including a time value representing when the internet address was last automatically accessed wherein the time value is updated by the internet browser; and e. a viewed column including a designation representing whether or not the web page information has been viewed by the user wherein the designation is updated by the internet browser.

71. The internet browser as claimed in claim 70 wherein the graphical user interface is displayed on a computer system having a display, a memory and an input device.

\* \* \* \* \*